(12) United States Patent
Marshall et al.

(10) Patent No.: US 8,632,310 B2
(45) Date of Patent: Jan. 21, 2014

(54) ROTOR BLADE AND METHOD OF MAKING SAME

(75) Inventors: Bryan Marshall, Mansfield, TX (US); Paul Sherrill, Grapevine, TX (US); Bryan K. Baskin, Arlington, TX (US); Tricia Hiros, Haltom City, TX (US); Paul K. Oldroyd, Azle, TX (US)

(73) Assignee: Textron Innovations Inc., Providence, RI (US)

( * ) Notice: Subject to any disclaimer, the term of this patent is extended or adjusted under 35 U.S.C. 154(b) by 777 days.

(21) Appl. No.: 12/808,201

(22) PCT Filed: Dec. 18, 2007

(86) PCT No.: PCT/US2007/087931
§ 371 (c)(1),
(2), (4) Date: Jun. 15, 2010

(87) PCT Pub. No.: WO2009/078871
PCT Pub. Date: Jun. 25, 2009

(65) Prior Publication Data
US 2010/0266416 A1 Oct. 21, 2010

(51) Int. Cl.
*B64C 27/473* (2006.01)
(52) U.S. Cl.
USPC ........................................... 416/226
(58) Field of Classification Search
USPC .......... 416/223 R, 224, 226, 229 R, 230, 232, 416/238, 241 R, 241 A; 29/419.1, 447, 29/889.71, 889.72
See application file for complete search history.

(56) References Cited

U.S. PATENT DOCUMENTS

| | | | |
|---|---|---|---|
| 3,455,757 A | | 7/1969 | Ford et al. |
| 3,782,856 A | | 1/1974 | Salkind et al. |
| 4,083,656 A | * | 4/1978 | Braswell et al. ............. 416/226 |
| 4,095,322 A | | 6/1978 | Scarpati et al. |
| 4,247,255 A | * | 1/1981 | De Rosa ...................... 416/141 |
| 4,284,443 A | | 8/1981 | Hilton |
| 4,379,013 A | | 4/1983 | Tambussi |
| 4,892,462 A | | 1/1990 | Barbier et al. |
| 5,156,786 A | | 10/1992 | Monroe |
| 5,248,242 A | * | 9/1993 | Lallo et al. .................... 416/226 |
| 6,676,080 B2 | * | 1/2004 | Violette ..................... 244/123.1 |
| 2006/0249868 A1 | * | 11/2006 | Brown et al. ................. 264/163 |

OTHER PUBLICATIONS

Office Action in related Canadian application No. 2,708,269, issued by the Canadian Intellectual Property Office, dated Apr. 3, 2012.
European Search Report in related European application No. 07869438.7, dated Feb. 1, 2011.
European Office Action from the European Patent Office in related European Patent Application No. 07869438.7, mailed Jul. 16, 2012, 6 pages.

(Continued)

*Primary Examiner* — Richard Edgar
(74) *Attorney, Agent, or Firm* — James E. Walton

(57) ABSTRACT

A helicopter rotor blade includes a structural composite skin defining a cavity therein; a composite spar disposed within the cavity and adhesively bonded to the skin, a portion of the spar exhibiting a C-shape in cross section; and a foam core disposed within the cavity and adhesively bonded to the skin. The structural composite skin forms an external, closed box structure configured to transmit mechanical loads encountered by the rotor blade.

13 Claims, 4 Drawing Sheets

(56) References Cited

OTHER PUBLICATIONS

First Office Action from the Chinese Patent Office in related Chinese Patent Application No. 200780101997.8, mailed Jul. 3, 2012, 10 pages.

Second Office Action from the Chinese Patent Office in related Chinese Patent Application No. 200780101997.8, mailed Jan. 25, 2013, 6 pages.

* cited by examiner

ROTOR BLADE AND METHOD OF MAKING SAME

TECHNICAL FIELD

The present invention relates in general to the field of helicopter rotor blades.

DESCRIPTION OF THE PRIOR ART

FIG. 1 depicts a cross-sectional view of a conventional helicopter rotor blade 101. Blade 101 derives a vast majority of its strength and stiffness from an internal torque tube, often referred to as a "D-spar", such as D-spar 103. The remaining volume within rotor blade 101 is occupied by a core 105, comprising a material such as honeycomb core. An upper skin 107 and a lower skin 109 are adhesively bonded to D-spar 103 and core 105. In conventional blades, skins 107 and 109 serve merely as fairings and provide little if any structural stiffness to blade 101.

The manufacture of a conventional rotor blade, such as blade 101, presents several challenges. Components of conventional rotor blades are fabricated separately, and then assembled in a closed tool or mold, wherein the components are adhesively bonded to one another. D-spar 103, however, is rigid. Cumulative tolerances associated with each of the component parts may prevent the mold from being closed and/or cause defects in blade 101 due to components interfering with one another.

There are many helicopter rotor blades well known in the art; however, considerable room for improvement remains.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
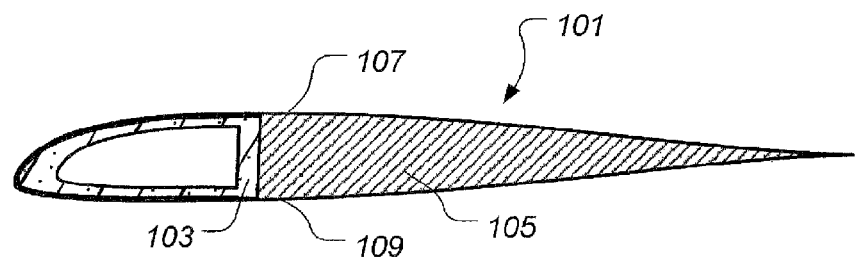
FIG. 1 is a cross-sectional view of a conventional helicopter rotor blade.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
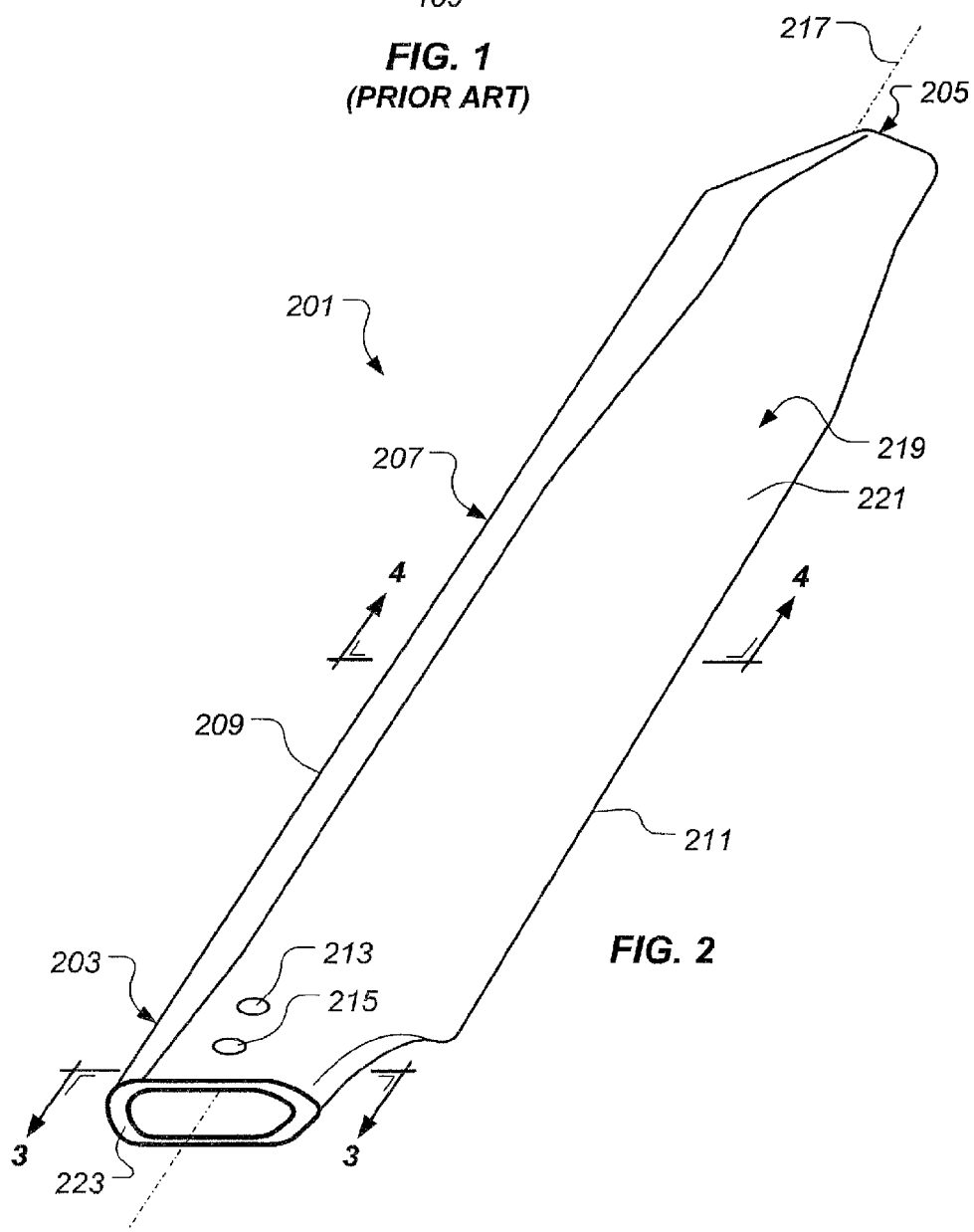
FIG. 2 is a perspective view of an illustrative embodiment of a helicopter rotor blade.

FIG. 2 depicts a perspective view of an illustrative embodiment of a helicopter rotor blade 201. Blade 201 comprises a root 203, a tip 205, and an airfoil 207 extending between root 203 and tip 205. Airfoil 207 comprises a leading edge 209 and a trailing edge 211. Blade 201 is attachable to a helicopter rotor (not shown) at root 203. In the illustrated embodiment, blade 201 defines two openings 213 and 215 that are generally aligned along a longitudinal axis 217 of blade 201. Such a configuration of openings 213 and 215 allows root 203 to be narrower than conventional blade roots and improves the manufacturability of blade 201. Fasteners (not shown) are inserted through openings 213 and 215 and through corresponding openings in a helicopter rotor (not shown) to attach blade 201 to the helicopter rotor. Blade 201 comprises a structural composite skin 219 that defines a cavity therein. Skin 219 forms an outer surface of blade 201 and provides significant structural stiffness and mechanical strength to blade 201, as is discussed in greater detail herein. In one embodiment skin 219 comprises an upper skin 221 and a lower skin 301 (not visible in FIG. 2 but shown in FIG. 3). Preferably, skin 219 comprises a fiber-reinforced, epoxy composite material. Blade 201 further comprises a composite spar 223 extending from root 203 to proximate tip 205. Preferably, spar 223 comprises a fiberglass/epoxy composite material.

Figure 3:
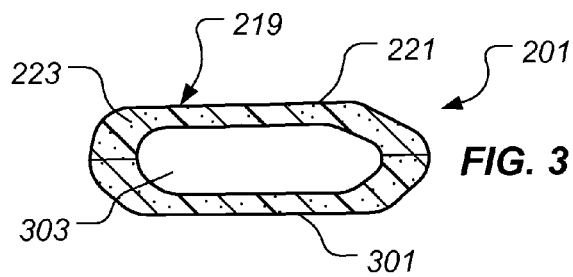
FIG. 3 is a cross-sectional view of the blade of FIG. 2, taken along the line 3-3 in FIG. 2.
Figure 4:
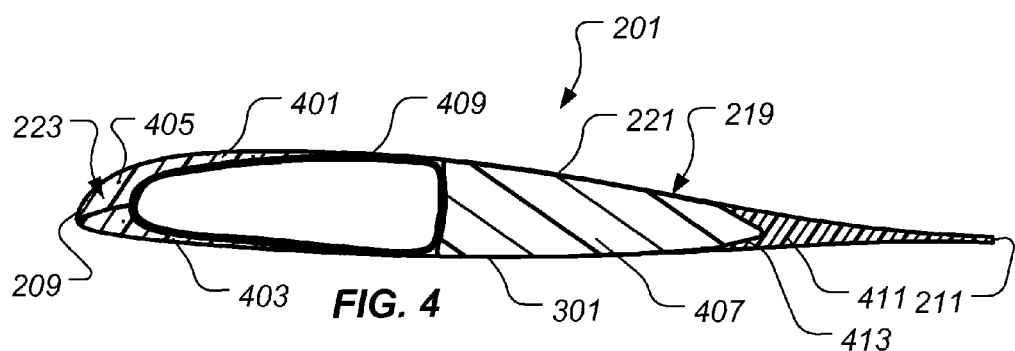
FIG. 4 is a cross-sectional view of the blade of FIG. 2, taken along the line 4-4 in FIG. 2.

FIGS. 3 and 4 depict a cross-sectional configuration of blade 201 at root 203 and at airfoil 207, respectively. Referring to FIG. 3, spar 223 forms a box structure at root 203 and defines a cavity 303. The box structure, however, exists only in root 203. As shown in FIG. 4, spar 223 exhibits a C-shape in cross section. Spar 223 comprises a first leg 401 and a second leg 403 extending from a nose portion 405. Spar 223 is oriented within skin 219 such that nose portion 405 is disposed proximate leading edge 209 of airfoil 207, with legs 401 and 403 pointed generally toward trailing edge 211. Spar 223 is adhesively bonded to skin 219.

Still referring to FIG. 4, blade 201 further comprises a foam core 407 disposed between spar 223 and trailing edge 211 of airfoil 207. Preferably, core 407 comprises a closed-cell foam material, such as foam material marketed under the trade name ROHACELL by Rohm, GmbH of Darmstadt, Germany; however, other core materials are contemplated by the present invention. Core 407 is adhesively bonded to skin 219. While not required for proper function of blade 201, the illustrated embodiment of blade 201 further comprises a composite tube 409 extending between and adhesively bonded to spar 223 and core 407. Tube 409 is particularly useful during the manufacture of blade 201, which is discussed in greater detail herein. Preferably, composite tube 409 comprises a fiber-reinforced, epoxy composite material. Trailing edge 211 of airfoil 207 comprises a fiber-reinforced composite portion 411, disposed between an aft end 413 of core 407 and skin 219. Preferably, composite portion 411 comprises a fiber-reinforced, epoxy composite material. Composite portion 411 is adhesively bonded to core 409 and to skin 219.

Skins of conventional rotor blades, such as skins 107 and 109 of rotor blade 101 shown in FIG. 1, serve merely as fairings and provide little if any structural stiffness to such conventional rotor blades. In such conventional rotor blades, structural stiffness and mechanical strength are provided substantially only by an internal torque tube, such as D-spar 103 shown in FIG. 1. Skin 219, however, provides significant structural stiffness and mechanical strength to blade 201. Skin 219 comprises a structural, fiber-reinforced, composite material, such as a carbon fiber-reinforced epoxy material. Skin 219 forms an external, closed box structure that is substantially continuously adhesively bonded to spar 223, core 407, and composite portion 411. Accordingly, mechanical loads encountered by rotor blade 201 are transmitted via skin 219 and other structural elements of blade 201 to the helicopter rotor.

Figure 5:
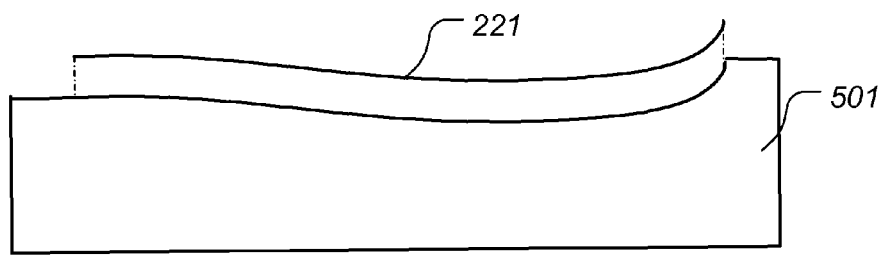
FIGS. 5-11 depict an illustrative embodiment of a method for making a helicopter rotor blade.
Figure 6:
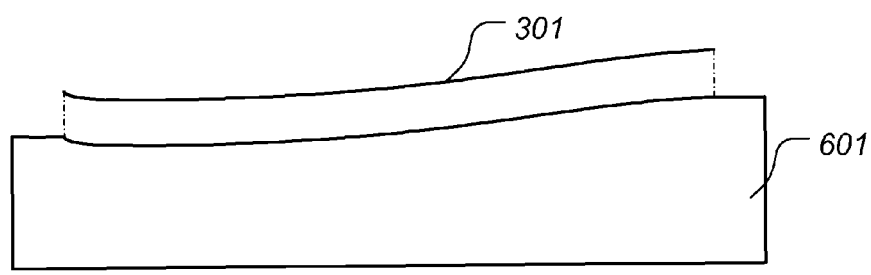

FIGS. 5-11 depict one particular embodiment of a method for making a composite rotor blade, such as rotor blade 201. Other methods, however, may exist and the method depicted in FIGS. 5-11 may be used to make rotor blades other than rotor blade 201. As shown in FIG. 5, composite plies making up upper skin 221 is laid up and cured on an upper skin mold 501. Composite plies making up lower skin 301 is laid up and cured on a lower skin mold 601. Upper skin mold 501 and lower skin mold 601 define the outer surface upper skin 221 and lower skin 301, respectively.

Figure 7:
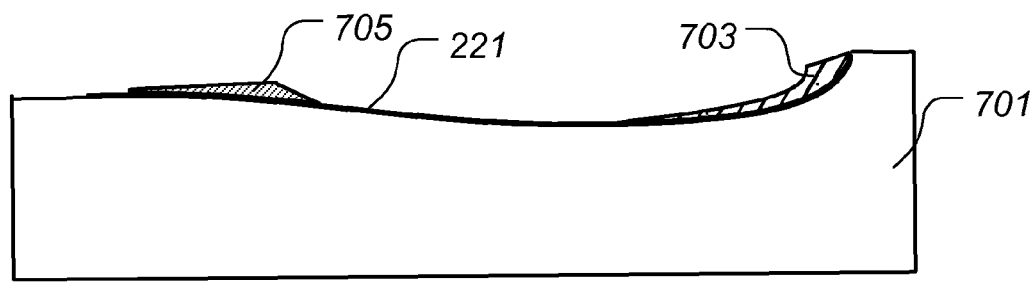

Referring now to FIG. 7, cured upper skin 221 is placed on a first spar layup tool 701. Note that upper skin mold 501 may be used as first spar layup tool 701 or a different tool may be used. Plies making up an upper portion 703 of spar 223 are laid up onto an inner surface of cured upper skin 221. Preferably, an automated fiber placement process is used to apply layers of polymer-impregnated fiber tows onto the inner surface of cured upper skin 221 to make up at least part of upper portion 703 of spar 223. More preferably, an automated fiber placement process is used to apply layers of polymer-impregnated fiber tows onto the inner surface of cured upper skin 221 to make up part of upper portion 703 of spar 223, while manual methods are used to apply some of the plies that make up upper portion 703 of spar 223. Most preferably, an automated fiber placement process is used to apply polymer-impregnated fiber tows to the inner surface of cured upper skin 221 to form plies that run along the length of blade 201. Preferably, an automated fiber placement process is used to apply layers of polymer-impregnated fiber tows onto the inner surface of cured upper skin 221 to make up an upper portion 705 of composite portion 411.

Figure 8:
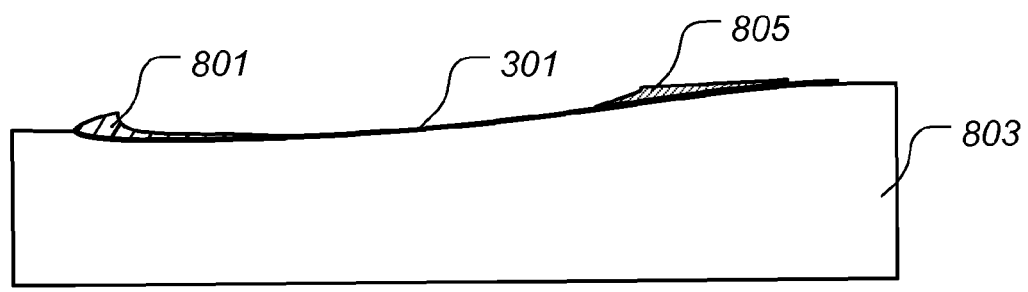

Referring now to FIG. 8, a lower portion 801 of spar 223 is laid up using a method corresponding to that disclosed herein relating to the laying up of upper portion 703 of spar 223. In other words, cured lower skin 301 is placed on a second spar layup tool 803. Note that lower skin mold 601 may be used as second spar layup tool 803 or a different tool may be used. Plies making up lower portion 801 of spar 223 are laid up onto an inner surface of cured lower skin 301. Preferably, an automated fiber placement process is used to apply layers of polymer-impregnated fiber tows onto the inner surface of cured lower skin 301 to make up at least part of lower portion 801 of spar 223. More preferably, an automated fiber placement process is used to apply layers of polymer-impregnated fiber tows onto the inner surface of cured lower skin 301 to make up part of lower portion 801 of spar 223, while manual methods are used to apply some of the plies that make up lower portion 801 of spar 223. Most preferably, an automated fiber placement process is used to apply polymer-impregnated fiber tows to the inner surface of cured lower skin 301 to form plies that run along the length of blade 201. Preferably, an automated fiber placement process is used to apply layers of polymer-impregnated fiber tows onto the inner surface of cured lower skin 301 to make up a lower portion 805 of composite portion 411.

Figure 9:
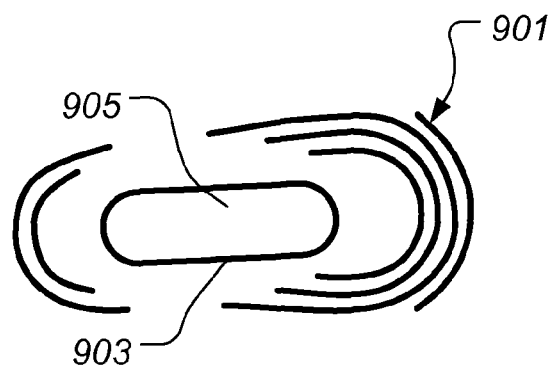

Turning now to FIG. 9, a plurality of composite material plies 901 are laid up onto an elastomeric bladder 903 in which a mandrel 905 is disposed. The plurality of plies 901, when cured, form tube 409. Mandrel 905 is used to maintain a general, unexpanded shape of bladder 903 prior to bladder being expanded, as is discussed in greater detail herein.

Figure 10:
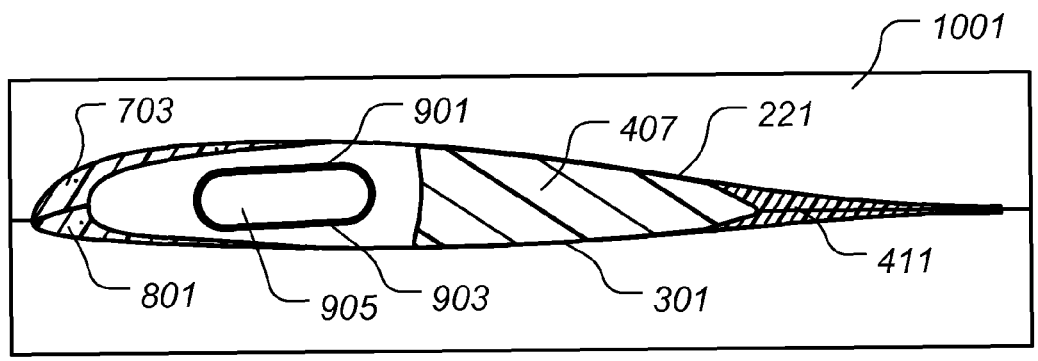
Figure 11:
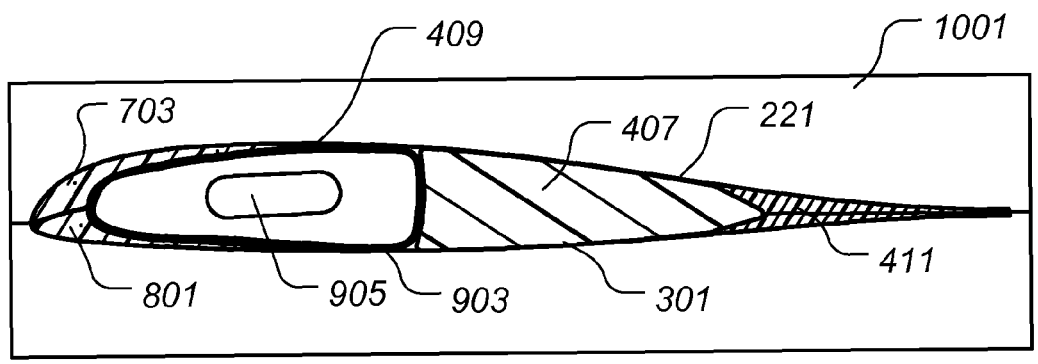

Upper skin 221 and upper portion 703 of spar 223 are removed from first spar layup tool 701 (shown in FIG. 7). Lower skin 301 and lower portion 801 of spar 223 are removed from second spar layup tool 803 (shown in FIG. 8). Referring now to FIG. 10, core 407, upper skin 221, lower skin 301, upper portion 703 of spar 223, lower portion 801 of spar 223, the plurality of plies 901 laid up on bladder 903 with mandrel 905 disposed in bladder 903, and adhesive, used to adhesively bond components of blade 201 together, are placed in a closed mold 1001. It should be noted that core 407 is made slightly larger than the final, desired size of core 407. The components of rotor 201 and mold 1001 are heated and otherwise processed according to the requirements of the particular composite materials and adhesives used in rotor 201 to cure rotor 201. During the curing process, bladder 903 is inflated, as shown in FIG. 11, thus causing the plurality of plies 901 to slide across each other and substantially conform to spar 223, skin 219, and core 407. The plurality of plies 901, expanded via bladder 903, provide compaction pressure internal to blade 201 during curing. As noted above, the plurality of plies 901, when cured, form tube 409. Cured blade 201 is then removed from mold 1001.

The present invention provides significant advantages, including: (1) providing a rotor blade that is easier and more cost effective to manufacture than conventional rotor blades; and (2) providing a rotor blade that has fewer defects than conventional rotor blades.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A helicopter rotor blade, comprising:
 a structural composite skin defining a cavity therein;
 a composite spar disposed within the cavity and adhesively bonded to the skin, a portion of the spar exhibiting a C-shape in cross section; and
 a foam core disposed within the cavity and adhesively bonded to the skin;
 a composite tube disposed within the cavity and formed from a plurality of plies urged against and adhesively bonded to the composite spar, the foam core, and the skin, so as to provide a compaction pressure internal to the blade during curing of the blade, the composite tube and extending between the composite spar and the foam core, the composite tube being formed from the expansion of a mandrel;
 wherein the structural composite skin forms an external, closed box structure configured to transmit mechanical loads encountered by the rotor blade; and
 wherein the structural composite skin is configured for providing significant stiffness and mechanical strength to the rotor blade.

2. The helicopter rotor blade, according to claim 1, wherein at least a portion of the spar is fabricated using an automated fiber placement process.

3. The helicopter rotor blade, according to claim 1, wherein the skin comprises:
 an upper skin and a lower skin.

4. The helicopter rotor blade, according to claim 1, wherein the spar comprises:
 an upper portion and a lower portion.

5. The helicopter rotor blade, according to claim 1, wherein the foam core comprises:
 a closed-cell foam material.

6. The helicopter rotor blade, according to claim 1, having a root and a longitudinal axis, the root defining openings that are generally aligned with the longitudinal axis for connecting the helicopter rotor blade to a helicopter rotor.

7. The helicopter rotor blade, according to claim 1, wherein the structural composite skin comprises a structural, fiber-reinforced, composite material, such as a carbon-reinforced epoxy material.

8. A method for making a helicopter rotor blade, comprising:
 providing a closed mold having an internal surface defining an outer surface of the helicopter rotor blade;
 providing a foam core;
 providing a cured composite upper skin;
 providing a cured composite lower skin;
 laying up an uncured upper portion of a spar onto an inner surface of the upper skin;
 laying up an uncured lower portion of the spar onto an inner surface of the lower skin;
 providing an elastomeric bladder and a mandrel disposed within the bladder;
 laying up a plurality of uncured composite plies about the elastomeric bladder;
 assembling the upper skin, the lower skin, the uncured upper portion of the spar, the uncured lower portion of the spar, the elastomeric bladder with the mandrel disposed therein and the plurality of uncured composite plies laid up on the elastomeric bladder, the foam core, and adhesive into the closed mold; and
 heating the assembled upper skin, the lower skin, the uncured upper portion of the spar, the uncured lower portion of the spar, the elastomeric bladder with the mandrel disposed therein and the plurality of uncured composite plies laid up on the elastomeric bladder, the foam core, and adhesive;
 inflating the elastomeric bladder during heating to provide compaction pressure internal to the blade, thereby causing a tight fit between the plurality of uncured composite plies, the uncured upper portion of the spar, the uncured lower portion of the spar, the cured upper skin, the cured lower skin, and the core; and
 curing the plurality of uncured composite plies, the uncured upper portion of the spar, and the uncured lower portion of the spar.

9. The method, according to claim 8, wherein laying up the upper portion of the spar onto the inner surface of the upper skin is accomplished, at least in part, by an automated fiber placement process.

10. The method, according to claim 9, wherein laying up the upper portion of the spar onto the inner surface of the upper skin is accomplished by laying up part of the upper portion of the spar onto the inner surface of the upper skin using a manual method.

11. The method, according to claim 8, wherein laying up the lower portion of the spar onto the inner surface of the lower skin is accomplished, at least in part, by an automated fiber placement process.

12. The method, according to claim 11, wherein laying up the lower portion of the spar onto the inner surface of the lower skin is accomplished by laying up part of the lower portion of the spar onto the inner surface of the lower skin using a manual method.

13. The method, according to claim 8, further comprising:
 generating openings in a root of the helicopter rotor blade generally aligned along a longitudinal axis of the helicopter rotor blade for attaching the helicopter rotor blade to a helicopter rotor.

* * * * *